United States Patent [19]

Rosenfeld et al.

[11] Patent Number: 4,680,371

[45] Date of Patent: Jul. 14, 1987

[54] PREPARATION OF AROMATIC POLYESTER WITH IMPROVED STABILITY BY ADDITION OF PHOSPHITE DURING PREPARATION

[75] Inventors: Jerold C. Rosenfeld, Tonawanda; Joseph A. Pawlak, Cheektowaga, both of N.Y.

[73] Assignee: Celanese Corporation, New York, N.Y.

[21] Appl. No.: 833,870

[22] Filed: Feb. 25, 1986

[51] Int. Cl.$^4$ ............................................. C08G 63/22
[52] U.S. Cl. .................................... 528/179; 528/125; 528/126; 528/128; 528/173
[58] Field of Search ............... 528/179, 125, 126, 128, 528/173

[56] References Cited

U.S. PATENT DOCUMENTS

| | | | |
|---|---|---|---|
| 3,112,286 | 11/1963 | Morris et al. | 260/29.7 |
| 3,299,172 | 1/1967 | Schade et al. | 260/860 |
| 3,377,409 | 4/1968 | McConnell et al. | 260/926 |
| 3,413,379 | 11/1968 | Schade et al. | 260/860 |
| 3,516,963 | 6/1970 | Friedman | 260/45.8 |
| 3,567,799 | 3/1971 | Preversek | 260/860 |
| 3,580,963 | 5/1971 | Kurzke et al. | 260/860 |
| 3,953,539 | 4/1976 | Kawase et al. | 524/116 |
| 4,075,163 | 2/1978 | Hofer et al. | 260/45.7 |
| 4,097,431 | 6/1978 | Asahara et al. | 260/22 R |
| 4,101,526 | 7/1978 | Buxbaum | 528/179 |
| 4,115,371 | 9/1978 | Bier et al. | 528/279 |
| 4,123,420 | 10/1978 | Kyo et al. | 528/127 |
| 4,250,281 | 2/1981 | Riecke | 525/444 |
| 4,302,382 | 11/1981 | Spanswick | 524/109 |
| 4,321,355 | 3/1982 | Maresca et al. | 528/180 |

FOREIGN PATENT DOCUMENTS 2121422A 12/1983 United Kingdom .

Primary Examiner—Lucille M. Phynes
Attorney, Agent, or Firm—George A. Depaoli

[57] ABSTRACT

A process for preparing an aromatic polyester derived from aromatic dicarboxylic acid and bisphenol includes adding a phosphite stabilizer to reduce coloration and reduce loss of intrinsic viscosity of the aromatic polyester to a molten mixture of the monomeric reactants or prepolymer.

14 Claims, No Drawings

PREPARATION OF AROMATIC POLYESTER WITH IMPROVED STABILITY BY ADDITION OF PHOSPHITE DURING PREPARATION

BACKGROUND OF THE INVENTION

This invention relates to a stabilized aromatic polyester composition and, more specifically, to a process for incorporating a phosphite stabilizer into an aromatic polyester composition.

The aromatic polyester used in this invention is obtained from terephthalic acid and/or functional derivatives thereof; isophthalic acid and/or functional derivatives thereof; or mixtures thereof (with the terephthalic acid/isophthalic acid unit mole ratio being about 9:1 to about 1:9) and a bisphenol of the following general formula (I)

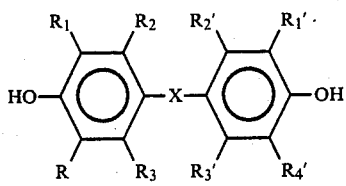

wherein —X is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each represents a member selected from the group consisting of a hydrogen atom, a chlorine atom, a bromine atom and an alkyl group containing 1 to 4 carbon atoms, or functional derivatives thereof.

Known methods for producing such an aromatic polyester include, for example, an interfacial polymerization method which involves mixing an aromatic dicarboxylic acid chloride dissolved in a water-immiscible organic solvent with an alkaline aqueous solution of a bisphenol, a solution polymerization method which comprises heating a bisphenol and an acid chloride in an organic solvent, and a melt polymerization method which comprises heating a phenyl ester of an aromatic dicarboxylic acid and a bisphenol, e.g., as disclosed in U.S. Pat. Nos. 3,884,990 and 3,946,091.

It is also known that aromatic polyesters derived from aromatic dicarboxylic acids and bisphenols have superior properties to polyesters derived from aromatic dicarboxylic acids and aliphatic alkylene glycols. Specifically, these polyesters have many superior characteristics, e.g., mechanical properties such as tensile strength, elongation, flexural strength, flexural recovery and impact strength, heat-distortion temperature, dimensional stability, electrical properties, and fire retardancy. Because of these superior properties, these polyesters are known to be useful in a wide range of fields as various molded articles, films, fibers, and coating materials obtained by extrusion molding, injection molding, etc.

The aromatic polyesters obtained by the above methods frequently assume yellow or brown colors in their as-prepared state. It is also noted that aromatic polyesters turn yellow when heated during injection molding, extrusion molding and other shaping operations which are used to form ordinary molded products or films. Such coloration is extremely inconvenient when a lack of color in the resulting molded articles is important.

Furthermore, when a pigment is incorporated into a molding composition to obtain a desired color, the color of the final molded product frequently is quite different from the desired color.

The aromatic polyesters used in this invention have a high heat distortion temperature, and therefore, are frequently used under high temperature conditions. The above-described coloration, however, proceeds generally under high temperature conditions and impairs the transparency of the molded product. Consequently, such a product cannot be used in applications which require transparency and a lack of color at high temperatures.

Such a coloration is also considered to occur with the decomposition of the polymer. Thus, coloration is synonymous with an irregular reduction in the logarithmic viscosity number (intrinsic viscosity) of the polymers constituting the molded articles. Coloration and reduction of intrinsic viscosity deteriorates the useful properties of these polymers and are therefore extremely disadvantageous in obtaining products which are uniform.

It has been suggested to incorporate organophosphorus (phosphite and phosphate) compounds into aromatic copolyester compositions in order to reduce coloration and depolymerization as in U.S. Pat. No. 4,123,420. However, as far as incorporating P-containing stabilizers into melt polymerized aromatic polyesters, there has been no indication relative to the importance of when such stabilizer should be incorporated into the polymer. While it appears best to add the stabilizer at the beginning of polymerization in order to have the antioxidant advantage as soon as possible, it has been found that if there is any moisture present, the phosphate or phosphite esters hydrolyze and form free acid which interferes with the polymerization catalyst and subsequent molecular weight buildup of the polymer.

SUMMARY OF THE INVENTION

A first object of this invention is to provide an aromatic polyester composition that is stabilized against heat and which can be used to produce molded articles which are free from coloration and which do not develop coloration even in use at high temperatures.

A second object of the invention is to provide an aromatic polyester composition which is stabilized against decomposition and reduction of intrinsic viscosity at elevated temperatures.

A further object is to provide a process for incorporating a stabilizer for reducing coloration and loss of intrinsic viscosity into an aromatic polyester composition which is formed by melt polymerization.

Extensive investigations have been made in order to remove the defects of aromatic polyesters described above. These investigations led to the discovery that the above-described undesirable coloration or heat decomposition and intrinsic viscosity reduction of aromatic polyesters can be markedly reduced by adding specified amounts of a phosphite stabilizer to the aromatic polyester and that very stable aromatic polyester compositions are provided. It has further been found that adding the phosphite stabilizer after mixing the aromatic diacid and bisphenol monomers and during reaction resulted in reduced coloration and viscosity loss without interfering with polymerization.

Accordingly, the present invention provides a process for making an aromatic polyester composition which comprises:

mixing (a) terephthalic acid and/or a functional derivative thereof; or isophthalic acid and/or a functional derivative thereof; or mixtures thereof with the terephthalic acid unit/isophthalic acid unit mole ratio being about 9:1 to about 1:9 and (b) a bisphenol of the general formula (I)

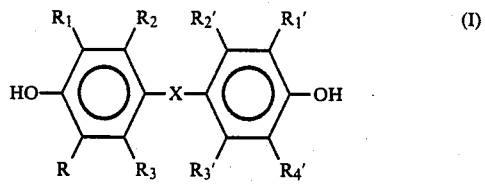

wherein —X is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, is a member selected from the group consisting of a hydrogen atom, a chlorine atom, a bromine atom and an alkyl group containing 1 to 4 carbon atoms, or functional derivatives thereof and adding a phosphite stabilizer after the monomers have been mixed. Broadly, the stabilizer will be present in amounts ranging from about 0.01 to about 2% by weight relative to the aromatic polyester (A).

DETAILED DESCRIPTION OF THE INVENTION

Molded products made from the aromatic polyester composition in the manner of this invention have markedly reduced coloration, and, even when exposed to high-temperature conditions, the molded products develop little coloration and show good stability to heat.

The aromatic polyester used in this invention is obtained from terephthalic acid and/or isophthalic acid and/or functional derivatives thereof and a bisphenol of the following general formula (I)

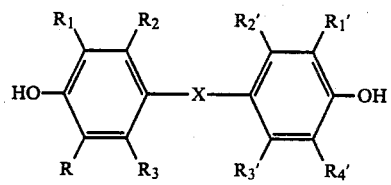

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

If a mixture of terephthalic and isophthalic acid is used about 90 to about 10 mole% of terephthalic acid and/or a functional derivative thereof and about 10 to about 90 mole% of isophthalic acid and/or a functional derivative thereof is preferred as the mixed acid component to be reacted with the bisphenol to prepare the aromatic polyester as referred to in this invention. Preferably, a mixture of 20 to 80 mole% of terephthalic acid and/or a functional derivative thereof and 80 to 20 mole% of isophthalic acid and/or a functional derivative thereof is used. The molar ratio of bisphenol to the sum of the terephthalic acid units and isophthalic acid units is substantially equimolar.

Suitable functional derivatives of terephthalic or isophthalic acid which can be used include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Examples of suitable bisphenols of the general formula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl) ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4'-hydroxyphenyl)ethane, 2,2-bis(4'-hydroxy-3'-methylphenyl)propane, 2,2-bis(4'-hydroxy-3'-chlorophenyl, )propane, 2,2-bis(4'-hydroxy-3', 5'-dichlorophenyl)propane, 2,2-bis(4'-hydroxy-3,5'-dibromophenyl)propane, and 1,1-bis(4'-hydroxyphenyl)-n-butane. 2,2-bis(4'-hydroxyphenyl)-propane, bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

In order to insure the aromatic polyesters used in this invention have good physical properties they should have an intrinsic viscosity (IV), defined by the following relationship, of about 0.3 to about 1.0, preferably 0.4 to 0.8, $$IV = -1 + \frac{\left[\left[\frac{t_1}{t_2} - 1\right] 4K' + 1\right]^{\frac{1}{2}}}{4K'(C)}$$

wherein $t_1$ is the falling time (in seconds) of a solution of the aromatic polyester in a solvent; $t_2$ is the falling time (in seconds) of the solvent; C is the concentration (in g/dl) of the aromatic polyester in the solution; and K' is a constant. For the aromatic polyesters of this invention K' will be about 0.42. The intrinsic viscosity, as used herein, is determined in 1,1,2,2-tetrachloroethane at 30° C.

The present polymerization process is carried out in the presence of an acidic, neutral or basic catalyst, such classifications being based on the reaction of a conventional acid-base indicator and the catalyst when the latter is dissolved in a polar ionizing solvent such as water.

More preferably, a basic catalyst is employed. Prior to its introduction into the reaction mass, the preferred basic catalyst is preferably converted to liquid form, e.g.

by melting or by dissolution in a liquid or normally solid, low melting solvent.

Suitable basic catalysts include the alkali metals, such as lithium, sodium, potassium, rubidium, cesium and francium and the carbonates, hydroxides, hydrides, borohydrides, phenates, bisphenates, (i.e. salt of a bisphenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum triisopropoxide and triphenyl tin hydroxide.

Phenol is the preferred solvent for the normally solid catalysts. Substituted phenols which can be used include those having the formula $O\ R_n$ wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2.

Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl phenol, p-ethyl-phenol, o-isopropyl phenol, m-methyoxy phenol, m-propyl phenol, p-propyl phenol, and the like.

Other solvents which are particularly useful are of the ether type, for example, tetrahydrofuran and the various glymes, for examples, ethylene glycol dimethylether and the like.

Combinations of catalyst and combinations of phenols or phenols and solvents may also be used.

Especially preferred liquid basic catalysts are charged dissolved in molten normal solid-low melting organic solvent such as phenol. Especially preferred catalysts providing excellent results are the basic catalysts, rubidium phenoxide, potassium phenoxide, and potassium borophenoxide, each dissolved in molten phenol.

Preferably, also when a basic catalyst is employed, the catalyst is introduced concurrently with the aforementioned molten reactants to the polymerization reactor to avoid heating the reactants in the presence of the catalyst prior to onset of the polymerization.

Less preferred catalysts include the metal oxides, metal acetates, titanium and tin compounds. Suitable metal oxides include antimony trioxide, germanium oxide, arsenic trioxide, lead oxide, magnesium oxide, and zinc oxide. Suitable metal acetates include cobalt acetate, zinc acetate, cadmium acetate and manganese acetate. Suitable titanium compounds include the organic titanates such as tetrabutyl titanate and tetraisopropyl titanate. Suitable tin compounds include dibutyloxide, dibutyl tin methoxide and dibutyl tin dilaurate.

In accordance with conventional reaction practice, a catalytically effective amount of the catalyst is employed, for example, about 0.005 to about 2 mol percent or more, preferably about 0.01 to 1 mole percent of the bisphenol in accordance with known techniques of polyester formation.

The present process can be carried out employing, in general, conditions which are conventional for melt polymerization.

According to the conventional practice, the solid reactants are heated above about 100° C., preferably above about 160° C. to melt the reactants. Onset of reaction in the presence of catalyst is generally at a temperature ranging from above about 100° C. to about 275° C., for example, above about 160° C. for reaction of bisphenol A, diphenyl terephthalate and diphenyl isophthalate. The reaction temperature employed is generally above about 100° C. to about 400° C. or higher, preferably above about 175° C. to about 350° C., more preferably about 175° C. to about 330° C. with the reaction temperature being raised gradually during the polymerization.

In the reaction the aryl group of the diester is displaced as the corresponding relatively volatile monohydroxy aromatic compound, e.g. phenol, for which provision is made for removal e.g. by distillation from the reaction mixture during the polymerization. Reaction pressure is generally diminished during the reaction, e.g. of about 0.1 mm. of mercury or lower, to aid in the aforementioned removal of the monohydroxy aromatic compound.

Generally, it is preferable in accordance with the prior art to carry out reaction in two stages. The first or prepolymerization stage is carried out at above about 100° C. to about 350° C. preferably about 160° C. to about 330° C., especially about 180° C. to about 300° C. to prepare a low molecular weight polyester or prepolymer of relatively low intrinsic viscosity, e.g. of less than about 0.1 to about 0.3 dl./g. A subsequent polymerization stage in which the prepolymer is heated at a somewhat higher temperature namely, at above about 200° C. to about 400° C. or higher, preferably at about 225° C. to about 350° C., especially at about 275° C. to about 330° C.

Conveniently, the polymerization stage is carried out in a different reaction vessel from that employed in the prepolymerization reaction stage with effective agitation of reaction mixture in both stages with generally more extreme agitation being used in the polymerization.

In carrying out the present invention, it is preferred prior to catalyst addition to melt the normally sold reactants to provide molten reactants and then heat the reactants if necessary to a temperature sufficient for onset of polymerization. According to this embodiment, a basic catalyst for the polymerization that is normally solid at 30° C. is then introduced in the liquid form to the polymerization reactor concurrent with the molten reactants.

According to another preferred embodiment of the invention, there is contemplated a semi-continuous process for polymerization wherein the prepolymerization stage of the process is carried out batchwise and the subsequent polymerization stage is carried out substantially continuously in one or more counter-current flow mechanically agitated thin film or wiped film reactors.

As an alternative to the aforementioned semi-continuous mode of operation, another preferred embodiment of the invention contemplates a fully continuous polymerization wherein, the prepolymerization is carried out in one or more stirred tank reactors, and preferably, the polymerization stage is carried out in one or more of the aforementioned wiped film reactors or thin film reactors.

It is especially preferred in carrying out semi- or fully continuous polymerization according to the aforementioned preferred modes of operation to complete polymerization in a polymerization reaction zone wherein the aforementioned wiped film reactor is followed by a multi-screw extrusion reaction vessel.

A persistent problem in the preparation of linear polyesters from bisphenol and dicarboxylic acids has been the undesirable high color in the product, i.e. the tendency of the polyester to develop an undesirable yellow color during the polyesterification. The color is attributed to thermal decomposition of the product polyester and/or the reactants in the reaction which is carried out at high temperatures ranging up to 400° C., or higher, and generally in the melt, i.e. without the use of a diluent.

Various stabilizers have been suggested which when added to the aromatic polyesters of the kind of this invention are believed to improve the undesirable coloration and depolymerization which typically develop.

In accordance with this invention, organophosphorus compounds are used as a thermal stabilizer to reduce coloration and intrinsic viscosity loss of the aromatic polyester. Organophosphorus stabilizers can be selected from known phosphate and phosphite stabilizer compounds. U.S. Pat. No. 4,123,420 describes numerous phosphate stabilizers for aromatic polyesters. Similarly trialkyl, triaryl, and mixed alkyl/aryl phosphites are useful stabilizers. A particularly effective stabilizer is triphenyl phosphite.

Various methods are suggested in U.S. Pat. No.4,123,420 to add the phosphorus-containing compound to the aromatic polyester. In the case of melt polymerization, it was suggested to feed the phosphorus-containing compound together with the monomers at the time of polymerization, or to chips or powders of the aromatic polyester during a molding operation such as injection molding, extrusion molding, etc. It was stated that if the phosphate compound is added to a powder or chips of the aromatic polyester and the mixture is molded; molded articles having a uniform color and uniform characteristics can be obtained.

However, to achieve the advantages of the antioxidant properties of the phosphorous ester stabilizers, it is preferred to add the stabilizer as soon as possible to the reaction mixture. Yet, it has been found that if moisture is present, the esters hydrolyze to form free acid which neutralizes the basic polymerization catalyst. Accordingly, adding the stabilizer at the wrong time can adversely effect the build up of molecular weight of the aromatic polyester. Likewise, adding the stabilizer at the time of molding may not be effective to reduce coloration.

In accordance with this invention, the organophosphorus stabilizer is added to the mixture of monomers at a stage where the presence of moisture is unlikely. Thus, adding the stabilizer after the molten monomers have been mixed and just before reaction does not result in the phosphorus esters being hydrolyzed to acid and consequent interference with the catalyst. The result is a reduction of color and improved viscosity loss of the aromatic polyester product. Addition of the stabilizer during initial polymerization may also be effective. When polymerization is carried out in a different reaction vessel from that employed in the prepolymerization stage, addition of stabilizer to the prepolymerization vessel is also effective to reduce coloration. The phosphite stabilizers will be present in amounts ranging from about 0.01 to about 2%, preferably 0.01 to 1%, and most preferably 0.05 to 0.35% by weight relative to the aromatic polyester.

The aromatic polyester composition of this invention may further contain various other additives such as antioxidants, ultraviolet adsorbers, antistatic agents and fire retardants, as needed according to the purpose of use. For example, the effect of the present invention can be increased further by adding the phosphorus-containing compound in conjunction with an antioxidant. Examples of suitable antioxidants are conventional phenolic antioxidants, phosphite-type antioxidants, amine-type antioxidants sulfur-containing compounds, organometallic compounds, and epoxy compounds. In addition, plasticizers, pigments and lubricants can also be incorporated in the aromatic polyester composition of this invention. Alternatively the aromatic polyester composition may be reinforced with glass fibers.

When an aromatic halogen compound such as decabromodiphenyl oxide is added to a resin composition to render the resin composition fire retardant, a molded article prepared from the composition frequently turns yellowish brown presumably due to heat decomposition. In such a case, too, the aromatic polyester composition of this invention is stabilized against heat, and coloration is markedly prevented.

If desired, the aromatic polyester composition of this invention may contain at least one additional polymers such as polyalkylene terephthalates (e.g., polyethylene terephthalate or polybutylene terephthalate), poly-(ethylene oxybenzoate), polycarbonates, polyethylene, polypropylene, polyamides, polyurethanes, polystyrene, ABS resins, EVA copolymers, polyacrylates, polytetrafluoroethylene, polymethyl methacrylates, polyphenylene sulfide, and rubbers. In other words, a mixture of the aromatic polyester and another polymer exemplified above can be used. The phosphorus-containing compound used in this invention exhibits a marked effect in this case, too.

A decrease in the degree of coloration or degradative decomposition of the aromatic polyester composition of this invention occurs when such is exposed to heat during molding or used at high temperatures. Hence, the aromatic polyester compositions of this invention can be used to form many useful articles employing generally known molding methods such as injection molding, extrusion molding or press molding. Typical examples of final products obtained by molding are films, monofilaments, and injection molded articles such as machine parts, automobile parts, electrical component parts, vessels and springs. The aromatic polyester compositions of this invention also are particularly useful as engineering plastics for various applications where the excellent properties of aromatic polyesters are required.

The following examples are given to illustrate the present invention in more detail. It should be noted that the invention is in no way to be construed as being limited to these Examples. Unless otherwise indicated all parts, percents, ratios and the like are by weight.

EXAMPLES 1-5

22.8 gm (0.100 mole) bisphenol-A, 7.96 gm (0.025 mole) diphenyl terephthalate and 23.87 gm (0.075 mole) diphenyl isophthalate were vacuum oven dried (about 16 hours at 70° C. in vacuum oven) and charged to a clean dry tube-shaped glass reactor with a mechanical stirrer and bearing, a gas inlet and an outlet to a graduated trap then to a vacuum pump. The system was flushed with nitrogen and then put under vacuum and heated via an oil filled jacket to about 100° C. for several hours. The vacuum was released with dry nitrogen and the system heated to about 200° C. When the monomers were melted, the potassium phenate catalyst was added (nitrogen blanket) and in some cases a phosphite stabilizer was also added. Over about 45 minutes at 210° C., vacuum was applied and increased gradually to about 0.1 mm as phenol distilled off. In some cases the phosphite was added at this point, i.e. when most of the phenol had distilled off. The temperature was raised to 240° C. for about 30 minutes still under full vacuum. The vacuum was released with dry nitrogen and the prepolymer removed.

The prepolymer was crushed in a small grinder and 1.0 gm of crushed prepolymer was charged to a clean 250 cc round bottom flask. The prepolymer was distributed around the bottom half of the flask by rotating it in the hot oil bath (310° C.). With the vacuum at about 0.1 mm Hg. the flask was set in a 310° C. oil bath for 30 minutes. At the end of the 30 minutes, the vacuum was released with dry nitrogen and the polymer scraped out of the flask.

Intrinsic Viscosity was determined run by preparing a 0.5 wt.% solution of the polymer or prepolymer in 1,1,2, 2 tetrachloroethane and determining flow time in a Cannon-Ubelhode viscometer (#75) and comparing it to flow time of pure solvent (assuming $k'=0.43$).

Weight loss of polymer samples was determined on a Mettler Thermoanalyzer with a sample of about 100 mg in dry air. The temperature was raised to 400° C. at 25° C./minute, held there for 2 hours and weight loss vs time recorded.

Table 1 outlines build-up of intrinsic viscosity for samples 1 through 5.

TABLE I
ADDITION OF PHOSPHITES DURING PREPARATION

| EXAMPLE No. | ADDITIVE | LEVEL[1] | IV (dl/g) PREPOLYMER | POLYMER[3] |
|---|---|---|---|---|
| (1) | None | — | 0.30 | 0.60, 0.73 |
| (2) | Diphenyldecyl-phosphite | 1.2[2] | 0.22 | 0.42 |
| (3) | Diphenyldecyl-phosphite | 0.29[4] | 0.27 | 0.51 |
| (4) | Triphenylphosphite | 0.29[4] | 0.28 | 0.68 |
| (5) | Tridecylphosphite | 0.29[4] | 0.27 | 0.58 |

[1]Mole-% based on BPA
[2]Added from the beginning
[3]310° for 30 min (about 0.1 mmHg)
[4]Added after most of the phenol was removed Examples 1 through 5 indicate that the all aromatic phosphite (Example 4) has little or no effect on I.V. build-up in the polymerization. The all aliphatic phosphite (Example 5) has a moderate retarding effect and the aliphatic aromatic phosphite (Example 3) retards the polymerization most.

Table II summarizes the thermogravimetry (TGA) results on the above polymers.

TABLE II
TGA of aromatic polyester prepared in the presence of phosphites

| | | % Weight Loss at 400° C. in air | | | |
|---|---|---|---|---|---|
| Example No. | Additive (level[1]) | 30 min. | 60 min. | 90 min. | 120 min. |
| 1. | (ave of 3) None | 3.2 + 0.5 | 4.9 + 0.7 | 7.0 + 0.8 | 9.1 + 0.4 |
| 2. | Diphenyldecyl Phosphate (1.2) | 1.7 | 2.6 | 3.4 | 2.9 |
| 3. | Diphenyldecyl Phosphite (0.29) | 1.5 | 2.2 | 2.7 | 3.0 |
| 4. | Triphenyl Phosphite (0.29) | 0.9 | 1.8 | 2.5 | 3.0 |
| 5. | Tridecyl Phosphite (0.29) | 1.6 | 2.7 | 3.8 | 4.8 |

[1]Mole - % based on PBA.
[2]Ave of test runs

All the polymers containing phosphites have substantial improved stability i.e. reduced weight loss when compared to the unmodified polymer (Example 1).

EXAMPLES 6 and 7

A polymerization was carried out as described above but the catalyst was 0.0027 gm (0.00005 mole)$KBH_4$.

The polymerization in Example 6 was repeated except that 0.1552 gm (0.0005 mole) triphenyl phosphite was added (initially) to the polymerization.

Results for Examples 6 and 7 are below.

TABLE III

| Example No. | Additive | Level Mole % Based on BPA | Intrinsic Viscosity (dl/g) Prepolymer | Polymer |
|---|---|---|---|---|
| 6 | None | — | 0.25 | 0.69 |
| 7 | Triphenyl Phosphite | 0.50 | 0.28 | 0.69 |

Examples 6 and 7 again demonstrate that triphenyl phosphite does not interfere with the polymerization.

EXAMPLES 8 and 9

5.21 gm (0.050 mole) neopentyl glycol, 11.69 gm (0.051 mole) bisphenol-A, 31.83 gm (0.100 mole) diphenyl tereththalate and 0.3 gm triphenyl phosphite were polymerized as described above with 0.00005 mole lithium phenate (in a solution with tetrahydrofuran and phenol).

TABLE IV

| Example No. | Additive | Level Mole % Based on BPA | Intrinsic Viscosity (dl/g) Prepolymer | Polymer |
|---|---|---|---|---|
| 8 | None | — | 0.32 | 0.78 |
| 9 | Triphenyl Phosphite | 1.0 | 0.34 | 0.77 |

The above two samples (8 and 9) were exposed for 10 minutes in a circulating air oven at 300° C. The sample containing triphenyl phosphite was somewhat lighter in color and contained less insolubles (when dissolved in tetrachlorethane) than the unmodified polymers.

EXAMPLE 10

A prepolymer was prepared as in Example 4 except that the triphenyl phosphite was added initially and the reaction was done with 1.0 mole bisphenol-A, 0.75 moles diphenyl isophthalate, 0.25 mole diphenyl terephthalte and 0.00025 moles $K_2CO_3$.

The prepolymer was some what yellow compared to the almost colorless prepolymer in Example 4 indicating an advantage of delayed addition of the phosphite.

What is claimed:

1. A process for the preparation of an aromatic polyester comprising; melting a reaction mixture of diaryl terephthalate and/or diaryl isophthalate and bisphenol-A; and polymerizing said mixture in a first stage to prepare a polyester oligomer and continuing said reaction in a second stage to produce the polyester product; subsequent to melting said reaction mixture and prior to completion of polymerization in said first stage adding a phosphite stabilizer to said molten mixture.

2. The process of claim 1 wherein said polymerization is carried out in the presence of a basic catalyst for said polymerization, said catalyst being normally solid at 30° C. and which is introduced in liquid form to the polymerization zone.

3. The process of claim 1 wherein said polymerization is carried out in the presence of a basic catalyst for said polymerization, said catalyst and said molten mixture being introduced substantially concurrently to the polymerization reaction.

4. The process of claim 1 wherein said polymerization is carried out in the presence of a basic catalyst for said polymerization, said catalyst being normally solid at 30° C., said catalyst being introduced in liquid form to the polymerization reaction substantially concurrently with the introduction of said molten mixture to the polymerization.

5. The process of claim 1 wherein said polymerization is carried out batchwise or substantially continuously in said second stage.

6. The process of claim 5 wherein the polymerization in the first stage is carried out batchwise.

7. The process of claim 5 wherein the polymerization in said first stage is substantially continuous.

8. The process of claim 1 wherein said phosphite is added in amounts of between about 0.01 to about 2% by weight relative to the aromatic polyester.

9. The process of claim 1 wherein said phosphite stabilizer is added to said molten mixture in said first stage.

10. The process of claim 1 wherein said phosphite stabilizer is added to said molten reaction mixture prior to polymerizing in said first stage.

11. The process of claim 1 wherein said phosphite stabilizer is a triaryl phosphite.

12. The process of claim 11 wherein said triaryl phosphite is triphenyl phosphite.

13. The process of claim 1 wherein said phosphite is added in amounts of between about 0.01 to about 1% by weight relative to the aromatic polyester.

14. The process of claim 1 wherein said phosphite is added in amounts of between about 0.05 to about 0.35% by weight relative to the aromatic polyester.

* * * * *